United States Patent
Lu

(10) Patent No.: US 7,465,493 B2
(45) Date of Patent: Dec. 16, 2008

(54) ACRYLIC PRESSURE SENSITIVE ADHESIVES

(75) Inventor: Xinya Lu, Marietta, GA (US)

(73) Assignee: Cytec Surface Specialties, S.A., Bruxelles (BE)

( * ) Notice: Subject to any disclaimer, the term of this patent is extended or adjusted under 35 U.S.C. 154(b) by 540 days.

(21) Appl. No.: 10/522,142

(22) PCT Filed: Jul. 9, 2003

(86) PCT No.: PCT/EP03/07365

§ 371 (c)(1), (2), (4) Date: Aug. 16, 2005

(87) PCT Pub. No.: WO2004/013246

PCT Pub. Date: Feb. 12, 2004

(65) Prior Publication Data

US 2006/0099413 A1 May 11, 2006

(51) Int. Cl.
*B32B 7/12* (2006.01)
*C08F 118/02* (2006.01)

(52) U.S. Cl. .............................. 428/355 AC; 428/356; 526/931

(58) Field of Classification Search ................. 526/931; 428/335 R, 355 AC, 356, 355 EN
See application file for complete search history.

(56) References Cited

U.S. PATENT DOCUMENTS 6,767,987 B2 * 7/2004 Okazaki ...................... 528/310

FOREIGN PATENT DOCUMENTS

| EP | 0 707 041 A | 4/1996 |
| WO | 92 10553 A | 6/1992 |

OTHER PUBLICATIONS

Weast, Robert C., *Handbook of Chemistry and Physics*, 56th Edition, p. 2, (1975).

* cited by examiner

*Primary Examiner*—Thao T. Tran
(74) *Attorney, Agent, or Firm*—Wenderoth, Lind & Ponack, L.L.P.

(57) ABSTRACT

The present invention concerns solvent-based acrylic pressure sensitive adhesives and hot melt (or solvent-less) acrylic pressure sensitive adhesives comprising a solution or misible blend of a. at least one hydrophobic (meth)acrylic polymer, b. at least one substantially water insoluble polyol having a number average molecular weight of from 1,000 to 20,000 and selected from the group consisting of polyester polyols, acrylic polyols, polycarbonate polyols and polyether polyols, c. at least one transition metal complex as cross-linking agent, d. optionally one or more tackifying resins, g. optionally one or more solvents, h. optionally one or more of plasticizers, adhesion promoters, pigments, fillers, antioxidants and UV stabilizers. It employs polyols which are substantially insoluble in water and miscible with the acrylic polymer used in the adhesive composition.

10 Claims, No Drawings

ACRYLIC PRESSURE SENSITIVE ADHESIVES

This is a 371 of PCT/EP2003/007365 filed Jul. 9, 2003 which claims the benefit of U.S. application Ser. No. 10/208,103 filed Jul. 31, 2002, now abandoned.

The present invention relates to acrylic pressure sensitive adhesive compositions.

The advantage of acrylic pressure sensitive adhesives is well known in the prior art. Many examples of acrylic pressure sensitive adhesives are described in Pressure Sensitive Adhesives Technology, 1st Edition, 1996, Istvan Benedek and Luc J. Heymans. However, conventional acrylic pressure sensitive adhesives (PSA) have two major disadvantages.

One is the relatively poor adhesion to low surface energy substrates although they have very good adhesion to many high surface energy substrates. This is because acrylic PSA, in general, has higher surface energy and higher polarity. There has been a huge increase in use of low surface energy materials such as polyolefins and plastics foam in the past years, and many applications for PSA products require good adhesion to low surface energy substrates. There is therefore a great need for an acrylic PSA that has good adhesion not only to high surface energy substrates but also to low surface energy substrates.

The second disadvantage is the relatively low tack particularly for an acrylic PSA with high shear resistance. It is very difficult for an acrylic PSA to have high tack and high shear resistance at the same time because increasing tack usually decreases the shear resistance. However, many high-end applications require PSA to have high shear resistance and also high tack.

JP 6-322355 discloses water-soluble or water-dispersable pressure sensitive adhesives containing water soluble polyether polyols and water soluble base polymers such as polyacrylates containing sulfonic acid salt groups. The function of the polyol in JP 6-322355 is simply to plasticize the base polymer. Such acrylic pressure sensitive adhesives inherently have very poor resistance to water or moisture and are therefore not suitable for most PSA applications. In addition, those adhesives, similar to other conventional acrylic pressure sensitive adhesives, are low tack and do not have good adhesion to low surface energy substrates EP 684,295 also discloses water-dispersable PSA compositions with 0.75 to 5 parts water soluble humectant having a molecular weight of 100 to 1000. Similarly, those PSA compositions have very poor resistance to water or moisture because of the water-soluble humectant and also share the deficiencies of other conventional acrylic PSAs.

It is therefore an object of the present invention to overcome the above mentioned disadvantages of such conventional acrylic pressure sensitive adhesives.

The present invention achieves this objective with solvent-based acrylic pressure sensitive adhesives and hot melt (or solvent-less) acrylic pressure sensitive adhesives comprising a solution or misible blend of
   a. at least one hydrophobic (meth)acrylic polymer,
   b. at least one substantially water insoluble polyol having a number average molecular weight of from 1,000 to 20,000 and selected from the group consisting of polyester polyols, acrylic polyols, polycarbonate polyols and polyether polyols.
   c. at least one transition metal complex as cross-linking agent,
   d. optionally one or more tacking resins,
   e. optionally one or more solvents.
   f. optionally one or more of plasticizers, adhesion promoters, pigments, fillers, antioxidants and UV stabilizers It employs polyols which are substantially insoluble in water and miscible with the acrylic polymer used in the adhesive composition.

Moreover, the functions of the polyols in the present adhesive formulation are very different from those of the prior art. In contrast to EP 684,295 or JP 6-322355, the polyols herein do not merely plasticize the base resin but rather promote adhesion and improve shear resistance of the adhesive. In U.S. Pat. No. 4,140,115, the polyols which are water soluble, are dispersed in, i.e. are incompatible with, the adhesive matrix, to reduce adhesion.

Water-soluble polyols are not very useful in the present invention because of poor compatibility between the polyol and acrylic copolymers which makes the adhesive properties less desirable and reduce the resistance to moisture or water.

Thus, the present invention provides a new approach to PSAs which comprises blending substantially water insoluble polyols with acrylic resins to improve the adhesion to low surface energy substrates as well as to improve other properties. By incorporating such polyols into acrylic PSAs, the adhesive exhibits improved adhesion to both high surface energy substrates (e.g. metal substrates) and low surface energy substrates (e.g. polyether polyurethane foams). By this approach, it also becomes possible to formulate a PSA with not only high tack properties but also high shear resistance.

The base resins of the present invention are hydrophobic and substantially water insoluble, unlike those of JP 6-322355. They are preferably copolymers of alkyl(meth) acrylates, where the alkyl is preferably 1 to 22 carbon atoms. Suitable alkyl(meth)acrylate monomers include ethyl acrylate, butyl acrylate, 2-ethylbenzyl acrylate, lauryl acrylate, cetyl acrylate, stearyl acrylate, eicosyl acrylate and mixtures thereof as well as the corresponding methacrylate monomers.

The (meth)acrylates may be employed in an amount of about 50 to 99% by weight.

The polyols in the present invention are substantially water insoluble and are oligomers having at least two terminal hydroxyl group such as polyester polyols, acrylic polyols, polycarbonate polyols polyether polyols, and mixtures thereof. The useful molecular weight range of those polyols is from about 300 to about 20,000 and preferably from about 1,000 to about 20,000. Some examples of commercial polyols suitable for the present invention include, but are not limited to, hydroxyl terminated poly(oxyalkylenes)(Poly-G 20-56, POLY-G 30-56, POLY-G-55-56, POLY-G 30-28 from Arch Chemicals), poly(tetrahydrofuran) diols (POLY-THF MW650, POLY-THF 2000 and POLY-THF 4500 from BASF), acrylic polyols(Acryflow P-120 from Lyondell Chemical), polytetramethyleneetherglycol (Terathane III from Dupont), and polyester polyols from hexanedioic acid and 2,2,4-trimethyl-1,3-pentanediol (LEXOREZ 1180-35 from Inolex Chemical).

The polyols are preferably employed in an amount of about 5 to 50% by weight.

The crosslinking agent of the present invention may be a mono- or multivalent metal ion selected from transition metal complexes such as transitional metal acetyl acetonate. They may be preferably employed in an amount of about 0.05 to 2.0% by weight.

The tackifying resins for the present invention, if employed, may be selected from the group consisting of:
   i) rosin acid, polymerized rosin acid, rosin esters and mixtures thereof;

ii) hydrogenated rosin acid, hydrogenated rosin esters and mixtures thereof;
iii) polyterpene and terpene phenolic resins;
iv) aromatic resins produced by the reaction of styrene, alpha-methyl styrene, vinyl toluene and mixtures thereof;
v) phenolic modified aromatic resins, benzoate resins, coumarone-indene resins, synthetic phenol resins, and mixtures thereof.

They may be preferably employed in an amount of up to about 0 to 50% by weight.

Suitable solvents, if employed, may be aliphatic esters such as ethyl acetate, aliphatic hydrocarbons such as heptane and hexane, halogenated aliphatic hydrocarbons, aromatic hydrocarbons such as toluene and xylene, aliphatic alcohols such as methanol, ethanol or isopropanol, aliphatic ketones such as acetone, and aliphatic esters such as ethyl acetate and mixtures thereof. They maybe employed in an amount of from about 0 to 90% by weight.

The adhesive compositions of the present invention may contain various additives, optionally in the amount of about 0.1 to 10.0% by weight per additive, such as antioxidants, UV stabilizers, pigments, fillers, plasticizers and adhesion promoters.

The (meth)acrylic polymer component is desirably the reaction product of:
i) about 50 to 99% by weight of at least one (meth)acrylate monomer having an alkyl group which contains about 1 to 22 carbon atoms;
ii) 0 to about 50% by weight of at least one monomer selected from the group consisting of (meth)acrylate monomers having an alkyl group containing about 1 to 22 carbon atoms, vinyl acetate and styrene; and
iii) about 0.5 to about 20% by weight of at least one polar monomer selected from the group consisting of monofunctional carboxylic acid monomers, multifunctional carboxylic acid monomers, monofunctional hydroxy-monomers, multifunctional hydroxy monomers, cyanoalkyl acrylates, acrylamides, acrylonitriles, e.g. (meth)acrylic acid, (meth)acrylamide, (meth)acrylonitrile, butanediol monoacrylate and vinyl pyrrolidone.

The advantages of the instant formulation include:
1) the adhesive with the polyol significantly increases adhesion to polyether polyurethane foam (low surface energy substrate) although all of the instant formulations have good adhesion to steel substrates;
2) the adhesive with the polyol exhibits increased shear resistance at 70° C. due to an H-bonding network between the polyol and acrylic copolymer.
3) since the polyols have a much lower viscosity than the acrylic polymer in solution, it becomes possible to formulate acrylic pressure sensitive adhesives with a solid content 50% higher than the conventionally available adhesives.

Acrylic polymers useful for pressure sensitive adhesive formulation are produced from solution polymerization, emulsion polymerization, or solid polymerization. Although acrylic polymers from an emulsion polymerization can be used, acrylic polymers from solution polymerization or solid polymerization are preferred for use in the present invention.

The acrylic polymer can be used either in solution or in the solid (or solvent-less) form. When an acrylic polymer solution is used, the other components of the pressure sensitive adhesive formulation can be mixed directly into the polymer solution to get a uniform adhesive solution.

An adhesive article is made by using either direct coating or transfer coating. In direct coating method, an adhesive article is made by applying a coating of the adhesive solution to a primary substrate and allowing the coating to dry out of solvents to have an adhesive layer consisting of the solid portion of the adhesive composition covering the surface of the substrate. In transfer coating method, the adhesive is first coated on a silicone release paper. After drying out solvents, the adhesive coating is then bonded to a primary substrate.

When an acrylic solid is used, the other components of the adhesives are mixed with the polymer by using hot-melt processing. An adhesive article is made by coating such a hot—melt adhesive onto a substrate to get a uniform adhesive layer covering the surface of the substrate.

The test methods used for determining peel adhesion and shear are those described in Test Methods for Pressure-Sensitive Tapes, 13th Edition, August 2001, Pressure-Sensitive Tape Council, Glenview, Ill., which is incorporated by reference herein.

Peel Adhesion (PSTC-101)

Peel adhesion is the force required to remove a coated flexible sheet material from a test panel measured at a specific angle and rate of removal. In the examples this force is expressed in pounds per inch (lb/in) width of coated sheet. The coating of the adhesive was applied to a silicone release paper. After the adhesive coating was dried in an oven for about 5 min. at about 125° C., it was bonded to a Mylar film. The specimens of 1×8 inches were cut from the coated Mylar film. After conditioning overnight at 74° F. and 50% relative humidity, the release paper was removed and specimens were bonded to the horizontal surface of a clean stainless steel test plate. The bonds were then rolled using an auto roller. After conditioning the bonds for a specific dwell time, the bonds were peeled at 180° angle in a peel tester at a constant peeling rate of 12 inches/minute. The results are reported as an average load in lb/in.

Shear Resistance (PSTC-107)

The shear resistance is a measure of the cohesiveness or internal strength of an adhesive. It is based upon the amount of force required to pull an adhesive strip from a standard flat surface in a direction parallel to the surface to which it has been affixed with a definite pressure. It is measured in terms of time required to pull a standard area of adhesive coated sheet material from a stainless steel test panel under a constant load.

The tests were conducted on adhesive coated strips applied to a stainless steel panel such that a 1×1 inch portion of each strip was in firm contact with the panel with one end portion of the tape being free. The panel with coated strip attached was held in a rack so that the panel forms an angle of 178°, and then a constant weight was hung on the extended tape free end.

Loop Tack Measurements (PSTC-16)

Loop tack was measured using a loop tack tester made by cutting 5×1 inch specimens of the Mylar coated laminates along the machine direction. After conditioning overnight at 74° F. and 50% relative humidity, the laminate was folded into a loop by taping the ends together. The loop was then mounted on the loop tack tester and a stainless steel plate clamped to the base of the tester. When the test was started, the loop was brought in contact with the stainless steel plate and then withdrawn. The load it takes to withdraw from the plate was recorded as the loop tack in lb/in$^2$.

The following acrylic polymers, tackifiers, and polyols are used to illustrate the present invention:

Acrylic polymer A was an acrylic copolymer (54 wt % 2-ethylhexyl acrylate, 31 wt % methyl acrylate, 10 wt % isooctyl acrylate, 5 wt % acrylic acid) solution having a polymer solid content of 40 wt % and crosslinker (aluminum acetyl acetonate) content of about 0.1 wt %.

Acrylic polymer B was an acrylic copolymer (57 wt % 2-ethylhexyl acrylate, 31 wt % ethyl acrylate, 7 wt % acrylic acid, 3% vinyl pyrrolidone) solution having a polymer solid content of 45% and crosslinker (aluminum acetyl acetonate) content of about 0.2 wt %.

Acrylic polymer C was an acrylic copolymer (73 wt % 2-ethylhexyl acrylate, 20 wt % methyl acrylate, 7 wt % acrylic acid) having a polymer solid content of 35 wt %.

Tackifier A is a phenol-modified copolymer of styrene and alpha methyl styrene (Sylvares 520 from Arizona Chemicals) having a softening point of 75° C.

Tackiler B is a resin polymerized from styrenic-based comonomers (Regalrez 1085 from Eastman Chemicals) having a softening point of 85° C.

Polyol A is hydroxy terminated poly(oxyalkylene) polyol (Poly G 20-56 from Arch Chemicals) having a molecular weight of about 2000.

Polyol B is a polytetrahydrofuran polyol (POLY THF 2000 from BASF) having a molecular weight of about 2000.

Polyol-C is an polytetramethyleneetherglycol (TERTHANE III from Dupont) having a molecular weight of about 3500.

The adhesive composition of the present invention may optionally further include additives known in the art such as, for example, plasticizers, adhesion promoters, pigments, fillers, antioxidants and UV stabilizers, etc., in a total amount of less than 20% by weight.

The following examples are merely illustrative and not meant to limit the scope of the present invention in any manner.

EXAMPLE I

A pressure sensitive adhesive (Sample I), according to the present invention, was prepared and compared to a conventional acrylic pressure sensitive adhesive (Solucryl 303 from UCB Chemicals, Smyrna, Ga. 30080)

| Composition of Sample I | |
| --- | --- |
| Acrylic Polymer A | 53 wt % |
| Tackifier A | 36 wt % |
| Polyol A | 11 wt % |

The adhesion test results for a 3.5 mils dry coated adhesive on a Mylar film were as follows:

| | Sample I | Solucryl 303* |
| --- | --- | --- |
| 180° peel on stainless steel (20 min. dwell time) | 7.2 lb/in | 4.5 lb/in. |
| 180° peel on high density polyethylene (20 min. dwell time) | 2.8 lb/in | 0.6 lb/in. |

Sample I shows better adhesion to both a high surface energy substrate (stainless steel) and a low surface energy substrate (polyethylene) than Solucryl 303.

EXAMPLE II

A pressure sensitive adhesive formulation containing polyether polyol was compared to a similar formulation but without polyether polyol.

| | Sample II-A | Sample II-B |
| --- | --- | --- |
| Acrylic polymer A | 53 wt % | 53 wt % |
| Acrylic polymer B | | 11 wt % |
| Tackifier A | 33.5 wt % | 33.5 wt % |
| Tackifier B | 2.5 wt % | 2.5 wt % |
| Polyol A | 11 wt % | |

The following compared the adhesion performance for Sample II-A and Sample II-B. The test results were obtained for a 3.5 mils thick coating of the dry adhesives on a Mylar film.

| | Sample II-A | Sample II-B |
| --- | --- | --- |
| 180° peel on stainless steel (20 min. dwell time) | 7.2 lb/in. | 8.5 lb/in. |
| Shear resistance (2 psi at 70° C.) | >72 hours | ~8 hours |
| Loop Tack on Steel | 7.0 lb/in.2 | 8.0 lb/in$^2$ |
| Adhesion to polyether polyurethane foam | Good | Poor |

Sample II-A of the present invention showed significantly better shear resistance at 70° C. Particularly, even though the formulation without the polyol (Sample II-B) had good adhesion to stainless steel, the adhesion to a polyether polyurethane foam was poor and the adhesive was easily removed from the foam. Sample II-A, on the other hand, had very strong adhesion to the foam and was not removable from the foam without destroying the foam surface structure.

EXAMPLE III

The below table shows three pressure sensitive adhesive formulations containing different polyols, respectively.

| | Sample III-A | Sample III-B | Sample III-C |
| --- | --- | --- | --- |
| Acrylic polymer B | 50 | 50 | 50 |
| Tackifier A | 30 | 30 | 30 |
| Polyol A | 20 | | |
| Polyol B | | 20 | |
| Polyol C | | | 20 |

The adhesion performance of the above three formulations was measured with a ~2 mils thick coating of the dry adhesive on a Mylar film.

| | Sample III-A | Sample III-B | Sample III-C | Solucryl 328* |
| --- | --- | --- | --- | --- |
| 180° peel on stainless steel (20 min. dwell time) | 2.1 lb/in. | 3.4 lb/in. | 4.0 lb/in | 2.0 lb/in. |

-continued

| | Sample III-A | Sample III-B | Sample III-C | Solucryl 328* |
|---|---|---|---|---|
| 180° peel on high density polyethylene (20 min. dwell time) | 1.1 lb/in. | 1.5 lb/in. | 1.7 lb/in. | 0.5 lb/in. |
| 180° peel on polypropylene (20 min. dwell time) | 1.2 lb/in. | 1.5 lb/in. | 1.7 lb/in. | 0.6 lb/in. |

(*UCB Chemicals, Smyrna, GA 30080)

All the three formulations containing the polyols had better adhesion, particularly to the low surface energy substrates such as polyethylene and polypropylene.

The invention claimed is:

1. An acrylic pressure-sensitive adhesive composition comprising a solution or miscible blend consisting essentially of:
   a. from 50 to 99% by weight of at least one hydrophobic $C_{1-22}$alkyl (meth)acrylate copolymer,
   b. at least one substantially water insoluble polyol oligomer having at least two terminal hydroxyl groups and a number average molecular weight of from 1000 to 20000 and selected from the group consisting of polyester polyols, acrylic polyols, polycarbonate polyols and polyether polyols,
   c. at least one cross-linking agent selected from the group consisting of a transition metal complex and aluminum acetyl acetonate.
   d. optionally at least one tackifying resin,
   e. optionally at least one solvent, and
   f. optionally at least one selected from the group consisting of: plasticizers, adhesion promoters, pigments, fillers, antioxidants and UV stabilizers.

2. The acrylic pressure sensitive adhesive composition according to claim 1 wherein:
   a. is present in an amount of about 30 to 95% by weight,
   b. is present in an amount of about 5 to 50% by weight,
   c. is present in an amount of about 0.05 to 2.0% by weight,
   d. is present in an amount of up to about 50% by weight,
   e. is present in an amount of up to about 90% by weight and
   f. is present in an amount of about 10% by weight.

3. The acrylic pressure-sensitive adhesive composition according to claim 1 wherein the (meth)acrylic copolymer comprises the reaction product of:
   i) 50 to 99% by weight of at least one alkyl (meth)acrylate monomer having an alkyl group which contains 1 to 22 carbon atoms;
   ii) 0 to 50% by weight of at least one other monomer selected from the group consisting of alkyl (meth)acrylate monomers having an alkyl group containing 1 to 22 carbon atoms, vinyl acetate and styrene; and
   iii) 0.5 to 20% by weight of at least one polar monomer selected from the group consisting of monofunctional carboxylic acid monomers, multifunctional carboxylic acid monomers, monofunctional hydroxy monomers, multifunctional hydroxy monomers, cyanoalkyl acrylates, acrylamides, acrylonitriles, butanediol monoacrylate and vinyl pyrrolidone.

4. The acrylic pressure-sensitive adhesive composition according to claim 1 wherein the cross-linking agent c. is selected from the group consisting of transition metal acetyl acetonates and aluminum acetyl acetonate.

5. The acrylic pressure-sensitive adhesive composition according to claim 1 wherein the tackifying resin d. is selected from the group consisting of:
   i) rosin acid, polymerized rosin acid, rosin ester and mixtures thereof;
   ii) hydrogenated rosin acid, hydrogenated rosin ester and mixtures thereof;
   iii) polyterpene and terpene phenolic resins;
   iv) aromatic resins consisting of a reaction product of styrene, alpha-methyl styrene, vinyl toluene and mixtures thereof and
   v) phenolic modified aromatic resins, benzoate resins, coumarone-indene resins, synthetic phenol resins, and mixtures thereof.

6. The acrylic pressure-sensitive adhesive composition according to claim 1 wherein the solvent of e. is selected from the group consisting of aliphatic esters, aliphatic hydrocarbons, halogenated aliphatic hydrocarbons, aromatic hydrocarbons, aliphatic alcohols, aliphatic ketones and mixtures thereof.

7. The acrylic pressure-sensitive adhesive composition according to claim 6 wherein the aliphatic hydrocarbons are heptane or hexane, the aromatic hydrocarbons are toluene or xylene, the aliphatic alcohols are methanol, ethanol or isopropanol, the aliphatic ketone is acetone and the aliphatic ester is ethyl acetate.

8. The acrylic pressure-sensitive adhesive composition according to claim 1 containing 40.1 to 2.0% by weight of an antioxidant or UV stabilizer.

9. An adhesive coated sheet material formed by coating a substrate sheet with the acrylic pressure-sensitive adhesive composition of claim 1.

10. The acrylic pressure-sensitive adhesive composition according to claim 1 wherein the cross-linking agent c. is aluminum acetyl acetonate.

* * * * *